F. WELKER.
VARIABLE SPEED GEARING.
APPLICATION FILED SEPT. 14, 1909.

955,488.

Patented Apr. 19, 1910.

2 SHEETS—SHEET 1.

WITNESSES

A. L. Gould
M. M. Haynie

INVENTOR
Fredrick Welker
BY
Benj. R. Catlin
ATTORNEY

F. WELKER.
VARIABLE SPEED GEARING.
APPLICATION FILED SEPT. 14, 1909.
955,488.
Patented Apr. 19, 1910.
2 SHEETS—SHEET 2.
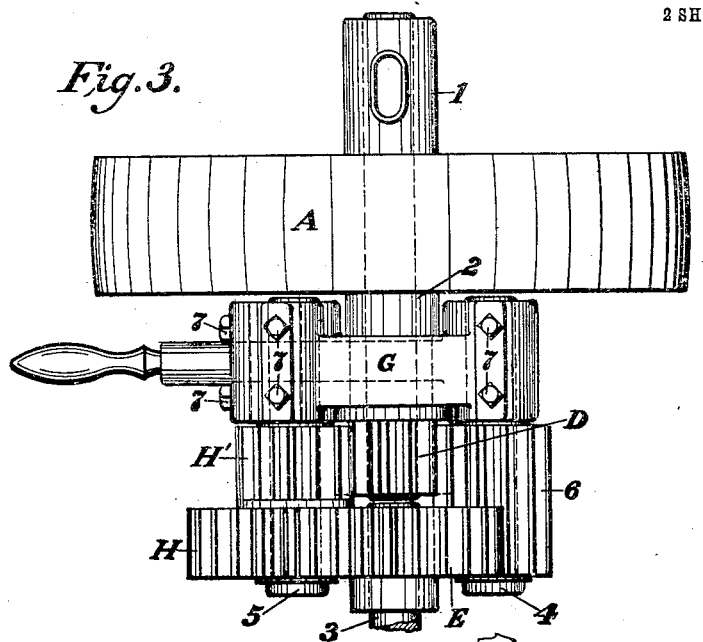
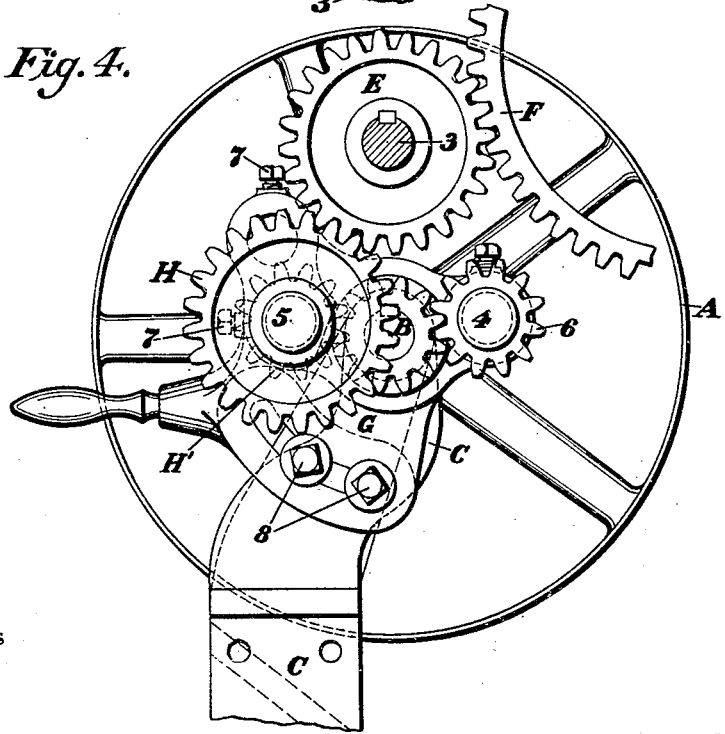
WITNESSES
H. L. Gould
M. M. Haynie
INVENTOR
Fredrick Welker
BY
Benj. R. Catlin
ATTORNEY

UNITED STATES PATENT OFFICE.

FREDRICK WELKER, OF WILLIAMSPORT, PENNSYLVANIA, ASSIGNOR TO AMERICAN WOOD WORKING MACHINERY CO., OF ROCHESTER, NEW YORK, A CORPORATION OF PENNSYLVANIA.

VARIABLE-SPEED GEARING.

955,488.     Specification of Letters Patent.    Patented Apr. 19, 1910.

Application filed September 14, 1909. Serial No. 517,586.

*To all whom it may concern:*

Be it known that I, FREDRICK WELKER, a citizen of the United States, residing at Williamsport, in the county of Lycoming and State of Pennsylvania, have invented certain Improvements in Variable - Speed Gearing, of which the following is a specification.

My invention relates to a system of gearing, simple in construction and of low cost, by which changes of speed may be obtained; and it consists in the employment of a compound gear which is made reversible on its shaft or stud in connection with other necessary devices whereby either one of three speeds may be obtained on the driven parts at the will of the operator.

Figure 1:
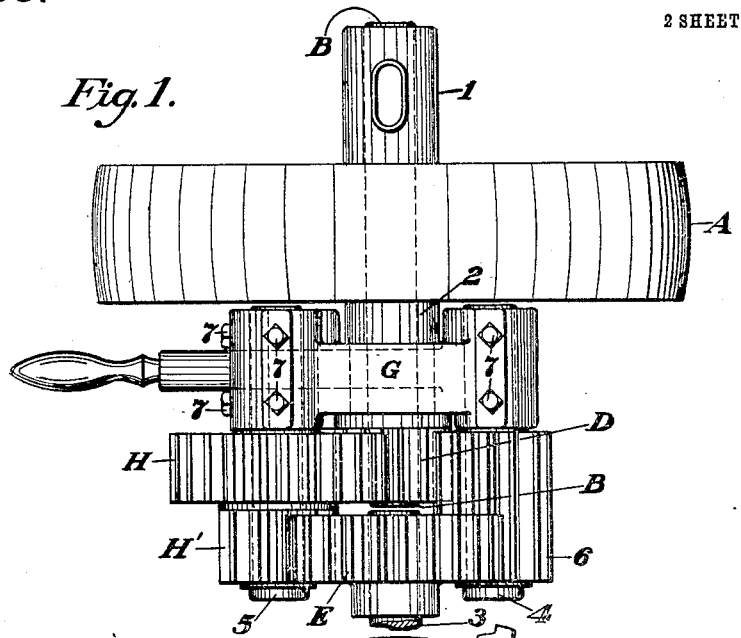
Figure 2:
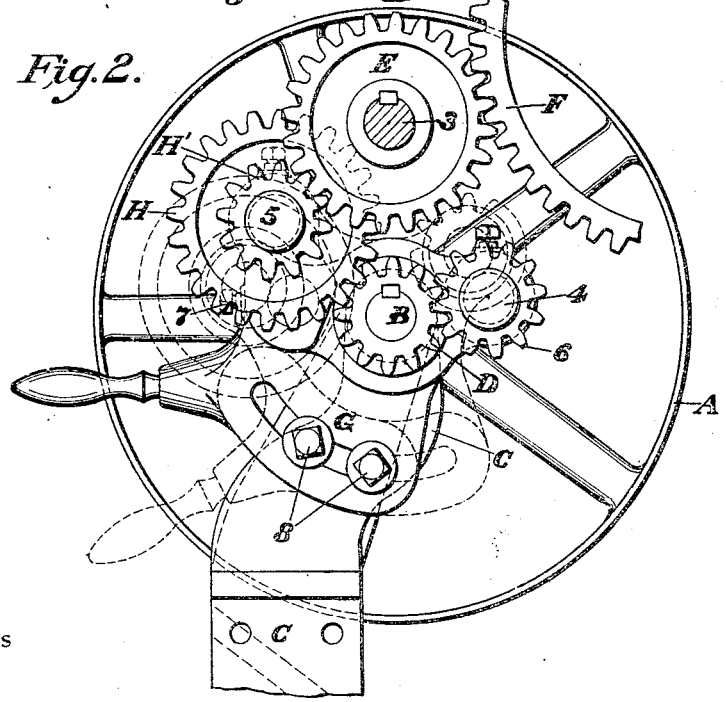

In the accompanying drawings, Figure 1 is a plan view of my device, showing the compound gear in the slowest position. Fig. 2 is a side elevation of the same. Fig. 3 is a plan view with the compound gear in the fastest position, and Fig. 4 is a corresponding elevation.

A is a driving pulley which receives power from a convenient moving part of the machine to which the gearing is applied: This pulley is secured to a shaft B, having boxes 1 and 2, which are adapted to be attached to the frame of the machine by means of a bracket C, to which both boxes are secured. At the outer end of shaft B, a small gear D is rigidly attached, and is the driver for the gear train.

E is an intermediate gear secured to a shaft 3, which is supported in boxes attached to the machine frame. Shaft 3 and gear E are sometimes required on planing and molding machines to convey power to the under feed roll train, but they are not a necessary part of my invention: gear E engages with the receiving gear F, which in turn actuates the other parts required to be varied in speed. Gears E and F are not in the same plane of revolution as the driver D, but receive power from one of the sections of the compound gear H H' hereinafter described.

G is a stud plate constructed to swing axially from the box 2, and studs 4 and 5 are mounted upon it by binding screws 7, or other suitable clamping means.

6 is an idle gear having an extended or double length face, and fitted to revolve freely on stud 4. This gear engages with the driving gear D at all times, and may also mesh into gear E, as described below. Stud 5 carries a compound gear H H', and this also meshes on one or the other of its sections into the gear D, and it may be reversed in its position on stud 5 so that either the large section H meshes with D, as in Fig. 2, or the small section H', as in Fig. 4. In order to make this shift possible it is necessary to transfer the stud 5 from the position shown in Fig. 2 to that shown in Fig. 4, so that the teeth of the gears mesh properly; this is provided for by having two holes in the plate G with set screws 7 or other clamping means for holding the studs in place.

8 are screws with washers under the heads, entering a slot in the plate G, and used to clamp the latter in position against the bracket C.

It will be seen from the above description that when gear D engages with gear H, and H' engages with E, as shown in Fig. 2, the receiver F will have a comparatively slow movement, on account of compounding downward on H H'; but when the plate G is swung over to the right as indicated in dotted lines in Fig. 2, so that double face gear 6 engages directly with E, the motion of the latter is considerably faster; again if the compound H H' and its stud 5 be removed, the gear reversed as indicated in Fig. 3, its stud placed in the lower hole in plate G, and the latter swung back to the left as in Fig. 4, the intermediate E and receiver F will move still faster, on account of the upward compounding of H H' in this position: thus three changes of speed are obtained by a very simple combination of parts.

I do not wish to be confined to the construction of the plate G, as shown in the drawings, because any carrier for the studs 4 and 5 which will enable me to adjust the gears D, H and 6 into and out of mesh and hold them in working position, will accomplish my purpose. Similarly the relative arrangement of the gearing as shown might be changed without affecting the operation or adjustments as above described.

The gear E, being only an intermediate, can be omitted in some cases, and the receiving gear F take its place.

What I claim as my invention and desire to secure by Letters Patent is:

1. In a variable speed gear train, a driving shaft and its gear, a compound gear engaging therewith, a receiving gear, said compound gear being reversible as to the planes of revolution of its sections, a transferable stud or shaft for the same, whereby either section of the compound gear may engage with the driving gear and the speed varied accordingly.

2. In a variable speed gear train, a driving shaft and its gear, an idle reversible compound gear, an idle gear with an extended face, a receiving gear, suitable means for engaging and disengaging said extended idle gear and said compound gear with said receiving gear, whereby either the extended idler, or the compound gear may be engaged, and a consequent change of speed obtained.

3. In a variable speed gear train, a receiving gear, a driving shaft and its gear, an idle compound gear reversible on its stud or shaft, an idle gear with an extended face, both gears engaging with the driving gear, a stud supporting plate swinging concentrically on the driving shaft or its box, studs mounted on said plate and carrying said idle gears, means for adjusting and clamping said supporting plate for the proper engagement of said receiving gear, for the purposes set forth.

4. In a variable speed gear train, a receiving gear, a driving shaft and its gear, an idle gear with extended face, an idle compound gear reversible as to the planes of revolution of its sections, both of said idle gears being in engagement with the driving gear, a stud plate swinging concentrically with said driving gear, studs in said plate carrying said idle gears, one stud being arranged to be transferred when the compound gear is reversed, whereby three variations of speed are obtained without additional gears.

In testimony whereof I have signed my name to this specification in the presence of two subscribing witnesses.

FREDRICK WELKER.

Witnesses:
HUGH GILMORE,
A. T. LEHMAN.